US011131886B2

United States Patent
Iwasaki et al.

(10) Patent No.: US 11,131,886 B2
(45) Date of Patent: Sep. 28, 2021

(54) LIQUID CRYSTAL DISPLAY DEVICE

(71) Applicant: FUJIFILM Corporation, Tokyo (JP)

(72) Inventors: Tatsuya Iwasaki, Kanagawa (JP); Katsufumi Ohmuro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/117,864

(22) Filed: Dec. 10, 2020

(65) Prior Publication Data

US 2021/0096412 A1    Apr. 1, 2021

Related U.S. Application Data

(63) Continuation of application No. 16/738,142, filed on Jan. 9, 2020, now abandoned, which is a continuation
(Continued)

(30) Foreign Application Priority Data

Jul. 21, 2017    (JP) .............................. JP2017-141952

(51) Int. Cl.
*G02F 1/13363*    (2006.01)
*G02F 1/1335*    (2006.01)
(Continued)

(52) U.S. Cl.
CPC .......... *G02F 1/13363* (2013.01); *G02F 1/137* (2013.01); *G02F 1/133514* (2013.01);
(Continued)

(58) Field of Classification Search
None
See application file for complete search history.

(56) References Cited

U.S. PATENT DOCUMENTS

| 2007/0076155 A1* | 4/2007 | Nakayama | ................ C08B 3/00 349/118 |
| 2008/0309854 A1* | 12/2008 | Ge | ...................... G02F 1/13363 349/98 |

(Continued)

FOREIGN PATENT DOCUMENTS

| JP | 2005-309382 A | 11/2005 |
| JP | 2007-279411 A | 10/2007 |

(Continued)

OTHER PUBLICATIONS

International Search Report issued in PCT/JP2018/027322 dated Oct. 16, 2018.
(Continued)

*Primary Examiner* — Ryan Crockett
(74) *Attorney, Agent, or Firm* — Jean C. Edwards, Esq.; Edwards Neils LLC

(57) ABSTRACT

Provided is a horizontal electric field mode liquid crystal display device in which light leak and tint change at the time of black display are reduced in case of being seen from an oblique direction. The liquid crystal display device is an IPS mode liquid crystal display device including at least a first polarizer, a first optical compensation layer, a liquid crystal cell, and a second polarizer in this order, in which the first optical compensation layer satisfies a predetermined relational expression, a total thickness-direction retardation Rth total(550) present between the liquid crystal layer and the second polarizer in the liquid crystal cell satisfies a predetermined relational expression, and a slow axis of the first optical compensation layer is parallel to an absorption axis of a polarizer layer.

20 Claims, 1 Drawing Sheet

Related U.S. Application Data of application No. PCT/JP2018/027322, filed on Jul. 20, 2018.

(51) Int. Cl.
*G02F 1/1343* (2006.01)
*G02F 1/137* (2006.01)

(52) U.S. Cl.
CPC .. *G02F 1/133528* (2013.01); *G02F 1/134309* (2013.01); *G02F 1/133562* (2021.01); *G02F 1/133567* (2021.01); *G02F 1/133633* (2021.01)

(56) References Cited

U.S. PATENT DOCUMENTS

| | | | | |
|---|---|---|---|---|
| 2009/0273740 A1* | 11/2009 | Yoshizawa | ........... | C09K 19/542 349/75 |
| 2009/0290100 A1* | 11/2009 | Haruta | ................ | G02B 5/3083 349/75 |
| 2010/0165265 A1* | 7/2010 | Moon | ............... | G02F 1/133634 349/96 |
| 2012/0194766 A1* | 8/2012 | Kaihoko | ........... | G02F 1/133634 349/96 |
| 2012/0194767 A1* | 8/2012 | Kaihoko | ........... | G02F 1/133634 349/96 |
| 2014/0293198 A1* | 10/2014 | Iwasaki | ............. | G02F 1/134363 349/96 |

FOREIGN PATENT DOCUMENTS

| | | | |
|---|---|---|---|
| JP | 2010-107953 A | | 5/2010 |
| JP | 2013-238770 | * | 11/2013 |
| JP | 2013-238770 A | | 11/2013 |
| WO | 2013/172364 A1 | | 11/2013 |

OTHER PUBLICATIONS

Written Opinion issued in PCT/JP2018/027322 dated Oct. 16, 2018.
International Preliminary Report on Patentability completed by WIPO dated Jan. 21, 2020 in connection with International Patent Application No. PCT/JP2018/027322.
Office Action, issued by the Japanese Patent Office dated Jan. 19, 2021, in connection with Japanese Patent Application No. 2019-530621.

* cited by examiner

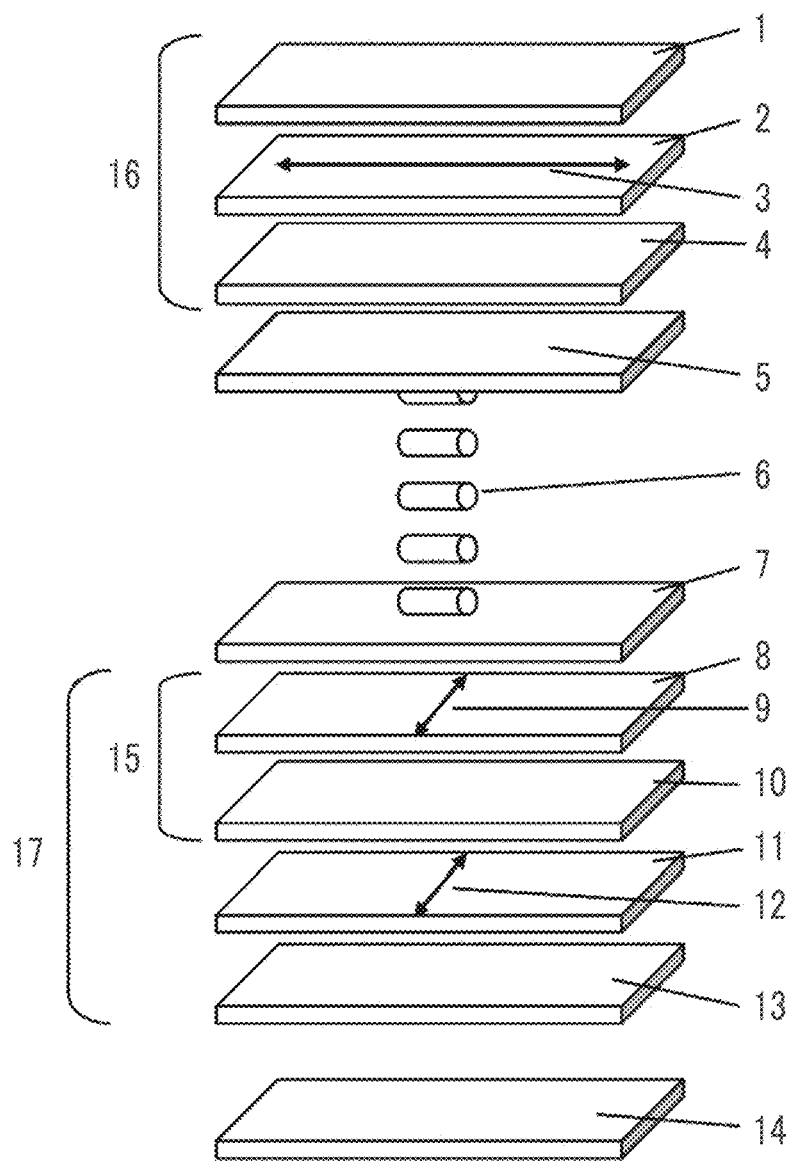

LIQUID CRYSTAL DISPLAY DEVICE

CROSS-REFERENCE TO RELATED APPLICATIONS

This application is a Continuation of U.S. patent application Ser. No. 16/738,142, filed on Jan. 9, 2020, which is a Continuation of PCT International Application No. PCT/JP2018/027322 filed on Jul. 20, 2018, which was published under PCT Article 21(2) in Japanese, and which claims priority under 35 U.S.C. § 119(a) to Japanese Patent Application No. 2017-141952 filed on Jul. 21, 2017. The above applications are hereby expressly incorporated by reference, in their entirety, into the present application.

BACKGROUND OF THE INVENTION

1. Field of the Invention

The present invention relates to an IPS mode liquid crystal display device.

2. Description of the Related Art

Unlike a twisted nematic (TN) mode or a vertical alignment (VA) mode in which liquid crystal molecules are driven by rising in a case where an electric field is applied between upper and lower substrates, an in-plane switching (IPS) mode or a fringe field switching (FFS) mode liquid crystal display device is a mode called a horizontal electric field mode in which liquid crystal molecules are allowed to respond in a substrate in-plane direction by an electric field including a component substantially parallel to a substrate surface.

In addition, the IPS mode or the FFS mode has a small limit on the viewing angle due to its structure in principle, and thus is known as a driving mode having characteristics such as a wide viewing angle and a small variation in chromaticity or tone change. Recently, the IPS mode or the FFS mode has been widely used in various display devices including not only display devices for televisions but also display devices for portable terminals and high-precision and high-quality commercial display devices.

In the horizontal electric field mode liquid crystal display device, a configuration in which the advantageous effects of the above-described liquid crystal cell can be utilized without hinderance by providing an isotropic film as a protective film of each of polarizing plates between which the cell is interposed (for example, JP2010-107953A).

However, in this configuration, compensation derived from a polarizer is not considered. In particular, a decrease in contrast caused by light leak in a view from an oblique direction occurs, and it is necessary to optically compensate a color shift. Therefore, a horizontal electric field mode liquid crystal display device is disclosed in which an optically-anisotropic layer is disposed in a display device to investigate compensation in the entire display device (for example, JP2005-309382A and JP2007-279411A).

SUMMARY OF THE INVENTION

As the optically-anisotropic layer, an optically-anisotropic layer that functions as a λ/2 plate is used in many cases, and the principle thereof is that compensation is made using a mechanism described in JP2009-122151A. It has been considered that the optically-anisotropic layer is not particularly limited as long as it exhibits the function, and various configurations have been disclosed. However, the present inventor investigated various configurations and found that a retardation present on a surface of a cell substrate opposite to an optically-anisotropic layer has a large influence on viewing angle light leak and viewing angle tint change at the time of black display.

An object of the present invention is to provide a horizontal electric field mode liquid crystal display device in which light leak and tint change at the time of black display are reduced in case of being seen from an oblique direction.

As a result of thorough investigation to achieve the object, the present inventors found that the object can be achieved by the following configurations.

(1) A liquid crystal display device comprising at least a first polarizer, a first optical compensation layer, a liquid crystal cell, and a second polarizer in this order, in which the liquid crystal cell includes a pair of substrates and a liquid crystal layer, in which an electric field including a component that is parallel to at least one of the substrates including an electrode is formed by the electrode, the pair of substrates being disposed to face each other, and the liquid crystal layer being disposed between the pair of substrates and having controlled alignment, an absorption axis of the first polarizer is parallel to a slow axis of the first optical compensation layer, a slow axis of the liquid crystal layer having controlled alignment at the time of black display is perpendicular to an absorption axis of the second polarizer, an in-plane retardation $Re1(550)$ and a thickness-direction retardation $Rth1(550)$ of the first optical compensation layer at a wavelength of 550 nm satisfy the following Expressions (1) and (2), $$80 \text{ nm} \leq Re1(550) \leq 320 \text{ nm}, \quad \text{Expression (1):}$$

$$-80 \text{ nm} \leq Rth1(550) \leq 150 \text{ nm}, \quad \text{Expression (2):}$$

at least one layer having a thickness-direction retardation is present between the liquid crystal layer and the second polarizer, a total in-plane retardation $Re\_total(550)$ and a total thickness-direction retardation $Rth\_total(550)$ between the liquid crystal layer and the second polarizer satisfy the following Expressions (3) and (4), $$0 \text{ nm} \leq Re\_total(550) \leq 10 \text{ nm, and} \quad \text{Expression (3):}$$

$$Rth\_total(550) \leq 0 \text{ nm.} \quad \text{Expression (4):}$$

(2) The liquid crystal display device according to (1), in which at least a color filter having a thickness-direction retardation is provided between the liquid crystal layer and the second polarizer.

(3) The liquid crystal display device according to (1) or (2), in which at least a second optical compensation layer is provided between the liquid crystal layer and the second polarizer.

(4) The liquid crystal display device according to any one of (1) to (3), in which at least a color filter having a thickness-direction retardation and a second optical compensation layer are provided between the liquid crystal layer and the second polarizer in this order from the liquid crystal layer side.

(5) The liquid crystal display device according to (3) or (4), in which an in-plane retardation $Re2(550)$ and a thickness-direction retardation $Rth2(550)$ of the second optical compensation layer at a wavelength of 550 nm satisfy the following Expressions (5) and (6), $$0 \text{ nm} \leq Re2(550) \leq 10 \text{ nm, and} \quad \text{Expression (5):}$$

$$-100 \text{ nm} \leq Rth2(550) \leq 0 \text{ nm.} \quad \text{Expression (6):}$$

(6) The liquid crystal display device according to any one of (3) to (5),
in which the second optical compensation layer is a film obtained by immobilizing a liquid crystal compound that is aligned.

(7) The liquid crystal display device according to (6),
in which the second optical compensation layer is a film obtained by immobilizing a rod-like liquid crystal compound that is aligned in a direction perpendicular to a substrate surface.

(8) The liquid crystal display device according to any one of (1) to (7),
in which a ratio of an in-plane retardation Re1(450) of the first optical compensation layer at a wavelength of 450 nm to the in-plane retardation Re1(550) of the first optical compensation layer at a wavelength of 550 nm satisfies the following Expression (7), $$0.95 \leq Re1(450)/Re1(550) \leq 1.30. \quad \text{Expression (7):}$$

(9) The liquid crystal display device according to any one of (1) to (8),
in which the first optical compensation layer has a two-layer structure, and a first optical compensation layer a and a first optical compensation layer b are laminated in this order from the liquid crystal cell side.

(10) The liquid crystal display device according to (9),
in which an in-plane retardation Re1a(550) and a thickness-direction retardation Rth1a(550) of the first optical compensation layer a at a wavelength of 550 nm satisfy the following Expressions (8) and (9), $$80 \text{ nm} \leq Re1a(550) \leq 200 \text{ nm,} \quad \text{Expression (8):}$$

$$20 \text{ nm} \leq Rth1a(550) \leq 150 \text{ nm,} \quad \text{Expression (9):}$$

an in-plane retardation Re1b(550) and a thickness-direction retardation Rth1b(550) of the first optical compensation layer b at a wavelength of 550 nm satisfy the following Expressions (10) and (11), $$0 \text{ nm} \leq Re1b(550) \leq 40 \text{ nm, and} \quad \text{Expression (10):}$$

$$-180 \text{ nm} \leq Rth1b(550) \leq -60 \text{ nm.} \quad \text{Expression (11):}$$

(11) The liquid crystal display device according to (9) or (10), wherein a ratio of a thickness-direction retardation Rth1b(450) of the first optical compensation layer b at a wavelength of 450 nm to the thickness-direction retardation Rth1b(550) of the first optical compensation layer b at a wavelength of 550 nm satisfies the following Expression (12), $$Rth1b(450)/Rth1b(550) \leq 1.00. \quad \text{Expression (12):}$$

(12) The liquid crystal display device according to anyone of (9) to (11),
in which the first optical compensation layer a is a polymer film including a cycloolefin polymer.

(13) The liquid crystal display device according to any one of (9) to (12),
in which the first optical compensation layer b is a film obtained by immobilizing a liquid crystal compound that is aligned.

(14) The liquid crystal display device according to (13),
in which the first optical compensation layer b is a film obtained by immobilizing a rod-like liquid crystal compound that is aligned in a direction perpendicular to a substrate surface.

(15) The liquid crystal display device according to any one of (1) to (14),
in which the first optical compensation layer is directly bonded to the first polarizer through a polyvinyl alcohol adhesive.

(16) The liquid crystal display device according to any one of (1) to (14),
in which the first optical compensation layer is directly bonded to the first polarizer through a curable adhesive composition that is cured by irradiation of an active energy ray or by heating.

(17) The liquid crystal display device according to any one of (1) to (16), wherein a backlight unit is further provided on a surface of the first polarizer opposite to the first optical compensation layer side.

According to the present invention, it is possible to provide a horizontal electric field mode liquid crystal display device in which light leak and tint change at the time of black display are reduced in case of being seen from an oblique direction.

BRIEF DESCRIPTION OF THE DRAWINGS

The sole FIGURE is a schematic diagram illustrating one example of an embodiment of the present invention.

DESCRIPTION OF THE PREFERRED EMBODIMENTS

Hereinafter, the details of the present invention will be described.

The following description regarding components has been made based on a representative embodiment of the present invention. However, the present invention is not limited to the embodiment.

In this specification, numerical ranges represented by "to" include numerical values before and after "to" as lower limit values and upper limit values.

In addition, in this specification, a polarizing plate refers to a polarizer having at least one surface on which a protective layer or a functional layer is disposed, and a polarizer and a polarizing plate are distinguished from each other.

In addition, in this specification, "parallel" or "perpendicular" does not exactly represent "parallel" or "perpendicular" and represents a range of ±5° from "parallel" or "perpendicular".

In addition, in this specification, "(meth)acrylate" represents any one of acrylate or methacrylate, "(meth)acryl" represents any one of acryl or methacryl, and "(meth) acryloyl" denotes any one of acryloyl or methacryloyl.

In addition, in this specification, a liquid crystal composition and a liquid crystal compound include those that exhibit liquid crystal properties by curing or the like.

<Retardation>

In the present invention, $Re(\lambda)$ and $Rth(\lambda)$ represent an in-plane retardation and a thickness-direction retardation at a wavelength of $\lambda$, respectively. Unless specified otherwise, the wavelength $\lambda$ refers to 550 nm.

In the present invention, $Re(\lambda)$ and $Rth(\lambda)$ are values measured at the wavelength $\lambda$ using AxoScan OPMF-1 (manufactured by Opto Science Inc.). By inputting an average refractive index ($(N_x+N_y+N_z)/3$)) and a thickness (d (m) to AxoScan, the following expressions can be calculated.

Slow Axis Direction (°)

$$Re(\lambda)=R0(\lambda)$$

$$Rth(\lambda)=((N_x+N_y)/2-N_z)\times d$$

<<Refractive Index>>

In this present invention, the refractive indices Nx, Ny, and Nz are measured using an Abbe refractometer (NAR-4T, manufactured by Atago Co., Ltd.), and a sodium lamp ($\lambda$=589 nm) is used as a light source.

In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley & Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

Hereinafter, an embodiment of the present invention will be described with reference to the drawings. A liquid crystal display device illustrated in the FIGURE includes: liquid crystal cells (5 to 7); a first polarizing plate 17 (8 to 13) and a second polarizing plate 16 (1 to 4) that are disposed such that the liquid crystal cell is interposed therebetween; and a backlight unit 14 that is provided on the outside further than the first polarizing plate 17. The liquid crystal cell (5 to 7) includes a liquid crystal cell upper substrate 5, a liquid crystal cell lower substrate 7, and a liquid crystal layer 6 that is interposed between the liquid crystal cell upper substrate 5 and the liquid crystal cell lower substrate 7. The liquid crystal cell lower substrate 7 includes an electrode layer (not illustrated in the FIGURE), and the electrode layer is configured to provide an electric field parallel to the surface of the liquid crystal cell lower substrate 7 to the liquid crystal layer. The electrode layer is typically formed of transparent indium tin oxide (ITO). An alignment layer (not illustrated in the FIGURE) for controlling the alignment of liquid crystal molecules 6 is formed on the electrode layer of the liquid crystal cell lower substrate 7 and the liquid crystal layer 6-side surface of the liquid crystal cell upper substrate 5 to control an alignment direction of the liquid crystal molecules 6. In order to maintain display symmetry, the alignment layer is preferably an ultraviolet (UV) alignment layer. In addition, although the FIGURE does not illustrate the detailed structure, a color filter is disposed on a surface of the liquid crystal cell upper substrate 5 opposite to the liquid crystal cell side.

In the present invention, at least one layer having a thickness-direction retardation is present between the liquid crystal layer 6 and the second polarizer 2, and a total in-plane retardation Re_total(550) and a total thickness-direction retardation Rth_total(550) between the liquid crystal layer 6 and the second polarizer 2 satisfy the following Expressions (3) and (4).

$$0 \text{ nm} \leq Re\_\text{total}(550) \leq 10 \text{ nm} \quad \text{Expression (3):}$$

$$Rth\_\text{total}(550) \leq 0 \text{ nm} \quad \text{Expression (4):}$$

As long as the thickness-direction retardation satisfies Expressions (3) and (4), any one or all of the liquid crystal cell upper substrate 5 of the liquid crystal cell, a second optical compensation layer 4 described below, another member, and a protective film may be present between the liquid crystal layer 6 and the second polarizer 2. In addition, in a case where the liquid crystal cell upper substrate 5 alone satisfies Expressions (3) and (4), the second optical compensation layer 4 is not necessarily used.

Re_total (550) satisfies preferably the following Expression (3-1) and more preferably the following Expression (3-2).

$$0 \text{ nm} \leq Re\_\text{total}(550) \leq 5 \text{ nm} \quad \text{Expression (3-1):}$$

$$0 \text{ nm} \leq Re\_\text{total}(550) \leq 3 \text{ nm} \quad \text{Expression (3-2):}$$

Rth_total (550) satisfies preferably the following Expression (4-1) and more preferably the following Expression (4-2).

$$-50 \text{ nm} \leq Rth\_\text{total}(550) \leq 0 \text{ nm} \quad \text{Expression (4-1):}$$

$$-35 \text{ nm} \leq Rth\_\text{total}(550) \leq -5 \text{ nm} \quad \text{Expression (4-2):}$$

In addition, in the FIGURE, the first polarizing plate 17 includes a first optical compensation layer 15 (8 to 10), a first polarizer 11, and a protective film 13 in this order. The second polarizing plate 16 includes a polarizer 11 and a protective film 1 and a second optical compensation layer 4 that are disposed on opposite surfaces of the polarizer 11, respectively. The liquid crystal cell is disposed between the second polarizing plate 16 and the first polarizing plate 17.

An absorption axis 3 of the second polarizer in the second polarizing plate 16 and an absorption axis 12 of the first polarizer 11 in the first polarizing plate 17 are disposed to be perpendicular to each other.

The absorption axis 12 of the first polarizer 11 in the first polarizing plate 17 is disposed to be perpendicular to a slow axis direction of the liquid crystal molecules 6 in the liquid crystal cell in a state where a voltage is not applied (OFF state).

In the FIGURE, the first optical compensation layer 15 satisfies the following Expressions (1) and (2).

$$80 \text{ nm} \leq Re1(550) \leq 320 \text{ nm} \quad \text{Expression (1):}$$

$$-80 \text{ nm} \leq Rth1(550) \leq 150 \text{ nm} \quad \text{Expression (2):}$$

The first optical compensation layer 15 has a two-layer structure including a first optical compensation layer a8 and a first optical compensation layer b10, and a slow axis 9 of the first optical compensation layer a8 and the absorption axis 12 of the first polarizer 11 are disposed in directions parallel to each other.

In addition, a ratio of an in-plane retardation Re1(450) of the first optical compensation layer 15 at a wavelength of 450 nm to the in-plane retardation Re1(550) of the first optical compensation layer 15 at a wavelength of 550 nm satisfies the following Expression (7).

$$0.95 \leq Re1(450)/Re1(550) \leq 1.30 \quad \text{Expression (7):}$$

As described above, in the FIGURE, it is preferable that the first optical compensation layer 15 has a two-layer structure including the first optical compensation layer a8 and the first optical compensation layer b10, and it is preferable that the first optical compensation layer a8 satisfies the following Expressions (8) and (9) and the first optical compensation layer b10 satisfies the following Expressions (10) and (11).

$$80 \text{ nm} \leq Re1a(550) \leq 200 \text{ nm} \quad \text{Expression (8):}$$

$$20 \text{ nm} \leq Rth1a(550) \leq 150 \text{ nm} \quad \text{Expression (9):}$$

$$0 \text{ nm} \leq Re1b(550) \leq 40 \text{ nm} \quad \text{Expression (10):}$$

$$-180 \text{ nm} \leq Rth1b(550) \leq -60 \text{ nm} \quad \text{Expression (11):}$$

As described above, the first optical compensation layer 15 may have a single-layer structure.

It is preferable that the second optical compensation layer 4 has a thickness-direction retardation, it is more preferable that the second optical compensation layer 4 satisfies the following Expressions (5) and (6).

$$0 \text{ nm} \leq Re2(550) \leq 10 \text{ nm} \quad \text{Expression (5):}$$

$$-100 \text{ nm} \leq Rth2(550) \leq 0 \text{ nm} \quad \text{Expression (6):}$$

The FIGURE illustrates a case where light is incident from the backlight unit 14 that is disposed outside the first polarizing plate 17 (the side of the first polarizer opposite to the first optical compensation layer side). In a non-driving state (OFF state) where a drive voltage is not applied to an electrode (not illustrated in the FIGURE), the liquid crystal molecules 6 in the liquid crystal layer is aligned to be substantially parallel to the surfaces of the liquid crystal cell upper substrate 5 and the liquid crystal cell lower substrate 7 such that the major axis thereof is perpendicular to the absorption axis 12 of the first polarizer 11. In this state, light that is allowed to enter a predetermined polarization state by the first polarizer 11 does not receive the birefringence effect of the liquid crystal molecules 6 so as to be absorbed by the absorption axis 3 of the second polarizer 2. At this time, black display occurs. On the other hand, In a driving state (ON state) where a drive voltage is applied to the electrode (not illustrated in the FIGURE), an electric field including a component parallel to the substrate is formed, and the liquid crystal molecules 6 is aligned such that the major axis thereof matches the direction of the electric field. As a result, the polarization state of light that is allowed to enter a predetermined polarization state by the first polarizer 11 changes due to the birefringence effect of the liquid crystal molecules 6 so as to pass through the second polarizer 2. At this time, white display occurs.

In the present invention, the thickness-direction retardation between the liquid crystal layer 6 and the second polarizer 2 is controlled and the phase difference of the optical compensation layer is adjusted to be in a predetermined range such that light leak or coloration so-called color shift in an oblique visual field generated at the time of black display is reduced. Hereinafter, each of the members and the like used in the liquid crystal display device according to the embodiment of the present invention will be described in detail.

[Liquid Crystal Material]

A liquid crystal material forming the liquid crystal layer used in the liquid crystal display device according to the embodiment of the present invention is not particularly limited. In the liquid crystal display device having the configuration illustrated in the FIGURE, for example, a nematic liquid crystal having a positive dielectric constant anisotropy $\Delta\varepsilon$ may also be used as the liquid crystal material. The thickness (gap) of the liquid crystal layer is preferably more than 2.8 µm and less than about 4.5 µm. In a case where the retardation ($\Delta n \cdot d$) of the liquid crystal layer is more than 0.25 µm and less than 0.40 µm, transmittance characteristics having substantially no wavelength dependence in a visible range can be more easily obtained. In addition, in a case where the liquid crystal molecules rotates horizontally from the original alignment direction by 45°, the maximum transmittance can be obtained. The thickness (gap) of the liquid crystal layer can be controlled by polymer beads. Of course, even with glass beads, fibers, or a columnar spacer formed of a resin, the same gap can be obtained. In addition, the liquid crystal material is not particularly limited as long as it is a nematic liquid crystal. In a case where the value of the dielectric constant anisotropy $\Delta\varepsilon$ is high, the drive voltage can be reduced. In a case where the refractive index anisotropy $\Delta n$ is low, the thickness (gap) of the liquid crystal layer can be increased, the sealing time of the liquid crystal can be reduced, and a variation in gap can be reduced.

[Liquid Crystal Cell]

The liquid crystal cell in the liquid crystal display device according to the embodiment of the present invention includes: a pair of substrates that are disposed to face each other and at least one of which includes an electrode; and a liquid crystal layer that is disposed between the substrates and has controlled alignment. It is preferable that an alignment film for aligning liquid crystal molecules is formed on both facing surfaces inside a liquid crystal cell substrate. In addition, it is preferable that a color filter is formed on any one of the facing surfaces. Further, a polarizer may be disposed inside the liquid crystal cell, and an optically-anisotropic layer contributing to optical compensation of retardation of the liquid crystal layer may be disposed. In addition, in general, a columnar or spherical spacer for maintaining the distance (cell gap) between the two substrates is disposed. In addition, a reflection plate, a collecting lens, a brightness improving film, a light emitting layer, a fluorescent layer, a phosphor layer, an antireflection film, an antifouling film, and a hard coat film may be disposed in the cell.

As the liquid crystal cell substrate, a transparent glass substrate is used. For example, a silicon glass substrate that is harder and endures high temperature may also be used. In addition, a plastic substrate having excellent heat resistance or a substrate formed of a polymer material may also be used. By using a substrate formed of a deformable material, flexibility can be applied. Further, a reflective display device is not particularly limited as long as one substrate is transparent, and a metal substrate formed of stainless steel can also be used as another substrate.

Typically, in a liquid crystal display device that includes a color filter and performs color display, one set of subpixels (pixel regions) of three primary colors (red, green, and blue) of light forms one pixel. In addition, subpixels of three or more colors may form one pixel. Examples of one aspect of the present invention include a multi-gap aspect in which the cell gaps in the subpixels of the respective colors forming one pixel are different from each other. In addition, a structure called a multi-domain in which one pixel is divided into a plurality of regions may be adopted to adjust the color balance or to average the viewing angle characteristics.

[Color Filter]

In the present invention, a color filter is disposed on a facing surface of one of the pair of substrates of the liquid crystal cell. The color filter is not particularly limited. For example, it is preferable that a color filter including the respective layers of red (R), green (G), and blue (B) is disposed.

The color filter can be prepared, for example, using the following method. First, a colored pixel of red, green, blue, or the like is formed on a transparent substrate according to the intended purpose. As a method of forming the colored pixel of red, green, blue, or the like on the transparent substrate, for example, a dyeing method, a printing method, a color resist method of applying a photosensitive color resin solution using a spin coater or the like and then patterning the applied solution in a photolithography step, or a laminating method can be appropriately used. For example, in the forming method including an application step, a color filter that includes RGB layers having different thicknesses can be formed by adjusting the application amount. In addition, in a case where the laminating method is used, a color filter that includes RGB layers having different thicknesses can be formed using transfer materials having different thicknesses. By changing the thickness of the color filter, Rth of the color filter can be changed.

In a case where a black matrix is formed using a black photosensitive resin, it is preferable that the black matrix is formed after the formation of the colored pixel. In a case where the black matrix is formed first, only a surface of the black photosensitive resin having a high optical density is cured. Therefore, a non-cured resin is dissolved (called "side etching") due to development that is subsequently performed, in particular, due to development that is repeatedly performed to form the colored pixel, and the formed matrix may peel off in extreme cases.

On the other hand, in a case where the black matrix is finally formed, the black matrix is surrounded by the colored pixel, and a developer is not likely to permeate into the black matrix from a cross-section. Therefore, side etching is not likely to occur, and there is a large advantageous effect in that a black matrix having a high optical density can be formed.

Further, in a case where the black matrix is formed first during the formation of a colored layer for forming the colored pixel using a laminating method, a region where the colored pixel is to formed is closed by the black matrix in a substantially lattice shape, there is a problem in that bubbles are incorporated during the lamination. However, this problem does not occur by forming the black matrix subsequently, and thus this method is preferable.

In a case where the light transmittance of the colored pixel is higher than 2% with respect to a photosensitive wavelength range of the black photosensitive resin, it is preferable that a light absorber is added to the colored pixel in advance such that the transmittance is 2% or lower. As the light absorber used at this time, various well-known compounds can be used. Examples of the light absorber include a benzophenone derivative (for example, Michler's Ketone), a merocyanine compound, a metal oxide, a benzotriazole compound, and a coumarin compound. Among these, a compound that has excellent light absorptivity and can maintain a light absorbing performance of 25% or higher even after a heat treatment at 200° C. or higher is preferable, and specific examples thereof include titanium oxide, zinc oxide, a benzotriazole compound, and a coumarin compound. In particular, a coumarin compound is preferable from the viewpoints of heat resistance and light absorptivity. The heat treatment at 200° C. or higher is performed for further curing after the formation of each pixel.

Next, the black photosensitive resin is provided to cover the pixel pattern on the entire surface of the transparent substrate. As a method of providing the black photosensitive resin, for example, a method of applying a black photosensitive resin solution using a spin coater or a roll coater or a method of applying a black photosensitive resin solution to a temporary support in advance to prepare an image forming material and transferring the black photosensitive resin layer to the pixel pattern can be used.

Next, the black photosensitive resin layer of the light shielding portion (black matrix) where the colored pixel is not present is cured by being exposed from the black photosensitive resin layer side through a photomask. Regarding the colored pixel, there is misalignment to some extent due to alignment error of an exposure device or the influence of heat expansion of the substrate, and thus normally the colored pixels are not arranged at a designed interval or with a designed size due to the thinning or thickening of the pixel itself. In particular, in the case of a substrate having a large size, this tendency becomes strong. Accordingly, in a case where the exposure is performed through the photomask at a designed interval, a portion where the black matrix overlaps the pixel or a portion where there is a gap between the pixels is generated. A protrusion is formed in the overlapping portion, and light leak occurs in the portion there is a gap. Thus, both the cases are not preferable.

In the present invention, it is not necessary that a layer having a thickness-direction retardation is present between the liquid crystal layer and the second polarizer. Specifically, it is preferable that the color filter has a thickness-direction retardation (Rth). Rth of the color filter is not particularly limited as long as the total thickness-direction retardation Rth_total(550) between the liquid crystal layer and the second polarizer is in a predetermined range. Rth is preferably −50 to 50 nm and more preferably −30 to 30 nm.

For example, in a case where the color filter is prepared using a transfer material, the retardation of the color filter may be adjusted by adding a retardation increasing agent or a retardation decreasing agent to a photosensitive layer or a colored layer that is a constituent layer of the transfer material.

Examples of the retardation increasing agent include a compound represented by the following Formula (λ) and an equivalent compound thereof.

Formula (X)

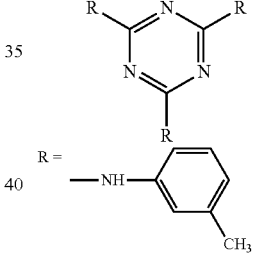

Examples of the retardation decreasing agent include a compound represented by the following Formula (XI).

Formula (XI)

$$R^{11}-\overset{\overset{O}{\|}}{\underset{\underset{O}{\|}}{S}}-\overset{R^{13}}{\underset{}{N}}-R^{12}$$

In Formula (XI), $R^{11}$ represents an alkyl group or an aryl group, and $R^{12}$ and $R^{13}$ each independently represent a hydrogen atom, an alkyl group, or an aryl group. In addition, it is more preferable that the total number of carbon atoms in $R^{11}$, $R^{12}$, and $R^{13}$ is 10 or more. $R^{11}$, $R^{12}$, and $R^{13}$ may have a substituent. As the substituent, a fluorine atom, an alkyl group, an aryl group, an alkoxy group, a sulfone group, or a sulfonamide group, is preferable, and an alkyl group, an aryl group, an alkoxy group, a sulfone group, or a sulfonamide group is more preferable. In addition, the alkyl group may be linear, branched, or cyclic. The number of carbon atoms in the alkyl group is preferably 1 to 25, more preferably 6 to 25, and still more preferably 6 to 20. Specific examples of the alkyl group include a methyl group, an ethyl group, a propyl group, an isopropyl group, a butyl group, an isobutyl group, a t-butyl group, an amyl group, an isoamyl group, a t-amyl group, a hexyl group, a cyclohexyl group, a heptyl group, an octyl group, a bicyclooctyl group, a nonyl group, an adamantyl group, a decyl group, a t-octyl group. an undecyl group, a dodecyl group, a tridecyl group, a tetradecyl group, a pentadecyl group, a hexadecyl group, a heptadecyl group, an octadecyl group, a nonadecyl group, and a didecyl group.

The number of carbon atoms in the aryl group is preferably 6 to 30 and more preferably 6 to 24. Specific example of the aryl group include a phenyl group, a biphenyl group, a terphenyl group, a naphthyl group, a binaphthyl group, and a triphenyl phenyl group.

[First Optical Compensation Layer]

As the first optical compensation layer according to the present invention, a layer having a compensation ability that is used for compensation of the above-described horizontal electric field mode can be used, and a film having a phase difference of about a λ/2 plate can be preferably used. Here, λ represents a wavelength and 550 nm in the present invention. As the film having a phase difference of about a λ/2 plate, a film having a phase difference of about a λ/2±30% is preferable, and a film having a phase difference of about a λ/2±15% is more preferable.

The first optical compensation layer may have a single-layer configuration or a multi-layer configuration. It is preferable that the first optical compensation layer satisfies the following Expressions (1) and (2). In addition, it is preferable that the slow axis of the first optical compensation layer is disposed to be parallel to the absorption axis of the polarizer disposed on the same side of the liquid crystal cell.

80 nm≤$Re1(550)$≤320 nm  Expression (1):

−80 nm≤$Rth1(550)$≤150 nm  Expression (2):

It is more preferable that the first optical compensation layer satisfies Expression (7).

0.95≤$Re1(450)/Re1(550)$≤1.30  Expression (7):

A material of the first optical compensation layer is not particularly limited as long as it has the above-described phase difference. From the viewpoint of easy manufacturing or the like, a layer that is formed using a polymer film or a liquid crystal composition is preferable. It is preferable that the polymer film is selected from a cellulose acylate film, a cycloolefin polymer film, or an acrylic polymer film. In addition, it is preferable that the acrylic polymer film includes an acrylic polymer including at least one unit selected from the group consisting of a lactone ring unit, a maleic acid anhydride unit, and a glutaric acid anhydride unit.

As the liquid crystal compound in the liquid crystal composition, for example, the existing compound such as a disk-like liquid crystal compound or a rod-like liquid crystal compound can be used. In order to immobilize the alignment state, it is preferable that the liquid crystal compound has a polymerizable group. That is, it is preferable that the liquid crystal composition is a polymerizable liquid crystal composition.

The first optical compensation layer may be a laminate including the above-described polymer film and a layer formed using the liquid crystal composition. In addition, the optical compensation layer can be used as a single layer, for example, by peeling off a layer formed of a composition including a liquid crystal compound having a polymerizable group.

For example, in order to reduce the thickness of the liquid crystal display device, the thickness of the polymer film is preferably as small as possible as long as optical characteristics, mechanical properties, and manufacturing suitability do not deteriorate and specifically is preferably 1 to 150 μm, more preferably 1 to 70 μm, and still more preferably 1 to 30 μm.

Hereinafter, an example of a configuration where the first optical compensation layer has a single-layer structure and a configuration where the first optical compensation layer has a two-layer structure will be described.

<Configuration where First Optical Compensation Layer has Single-Layer Structure>

In a case where the first optical compensation layer has a single-layer structure, it is preferable that the first optical compensation layer alone is a film having a phase difference of about a λ/2 plate. Specifically, it is preferable that the following expressions are satisfied.

200 nm≤$Re1(550)$≤320 nm

−40 nm≤$Rth1(550)$≤40 nm

The first optical compensation layer can be obtained by largely stretching a formed of a polymer film having a characteristic of nz>nx.

For example, in the case of a film formed of cellulose acetate benzoate that is a cellulose acylate having an aromatic acyl group, the first optical compensation layer can be obtained using a film manufacturing method include a method including: casting a dope in which cellulose acetate benzoate is dissolved in a solvent to a metal support for film formation; drying the solvent to obtain a film; and stretching the obtained film at a large stretching ratio of about 1.3 times to 1.9 times to align a cellulose molecular chain.

In addition, the first optical compensation layer can be prepared by laminating a shrinkable film on a single surface or both surfaces of a polymer film and thermally stretching the laminate, for example, as described in JP1993-157911A (JP-H5-157911A) and JP2006-072309A.

The thickness of the first optical compensation layer is preferably 1 to 150 μm, more preferably 1 to 70 μm, and still more preferably 1 to 30 μm.

(Configuration where First Optical Compensation Layer has Two-Layer Structure)

In the case of the two-layer configuration, the first optical compensation layer includes the first optical compensation layer a and the first optical compensation layer b, it is preferable that the optical compensation layer includes two layers including: the first optical compensation layer a that is a biaxial film of nx>ny≥nz (a B-plate or a positive A-plate); and the first optical compensation layer b that is a [quasi-]uniaxial film of nx≅ny<nz (a positive [quasi-] C-plate). Specifically, it is preferable that an in-plane retardation $Re1a(550)$ and a thickness-direction retardation $Rth1a(550)$ of the first optical compensation layer a at a wavelength of 550 nm satisfy the following Expressions (8) and (9), and an in-plane retardation $Re1b(550)$ and a thickness-direction retardation $Rth1b(550)$ of the first optical compensation layer b at a wavelength of 550 nm satisfy the following Expressions (10) and (11).

80 nm≤$Re1a(550)$≤200 nm  Expression (8):

20 nm≤$Rth1a(550)$≤150 nm  Expression (9):

0 nm≤$Re1b(550)$≤40 nm  Expression (10):

−180 nm≤$Rth1b(550)$≤−60 nm  Expression (11):

In this aspect, it is preferable that the first optical compensation layer a is disposed on the cell substrate side and the first optical compensation layer b is disposed on the polarizer side.

(First Optical Compensation Layer a)

The first optical compensation layer a satisfies more preferably the following Expression (8-1) and more preferably the following Expression (9-1).

$$100 \text{ nm} \leq Re1(550) \leq 150 \text{ nm} \quad \text{Expression (8-1):}$$

$$50 \text{ nm} \leq Rth1(550) \leq 120 \text{ nm} \quad \text{Expression (9-1):}$$

The first optical compensation layer a can be obtained by stretching a cellulose acylate film, a cyclic polyolefin film, or a polycarbonate film, which is formed using an appropriately method such as a melting film formation method or a solution film formation method, for example, with a machine-direction stretching method using a control of a peripheral speed of a roll, a cross-direction stretching method using a tenter, or a biaxial stretching method. The details can be found in JP2005-338767A. In addition, a polymer formed of a composition including a liquid crystal compound having a polymerizable group that exhibits biaxiality by alignment can also be used.

The thickness of the first optical compensation layer is preferably 1 to 80 μm, more preferably 1 to 40 μm, and still more preferably 1 to 25 μm.

(First Optical Compensation Layer b)

The first optical compensation layer b satisfies more preferably the following Expression (10-1) and more preferably the following Expression (11-1).

$$0 \text{ nm} \leq Re2(550) \leq 20 \text{ nm} \quad \text{Expression (10-1):}$$

$$-140 \text{ nm} \leq Rth2(550) \leq -80 \text{ nm} \quad \text{Expression (11-1):}$$

The thickness-direction retardation of the first optical compensation layer b is not particularly limited, and from the viewpoint that the effects of the present invention is more significant, a ratio of a thickness-direction retardation Rth1b (450) of the first optical compensation layer b at a wavelength of 450 nm to the thickness-direction retardation Rth1b(550) of the first optical compensation layer b at a wavelength of 550 nm satisfies the following Expression (12).

$$Rth1b(450)/Rth1b(550) \leq 1.00 \quad \text{Expression (12):}$$

The lower limit of Rth1b(450)/Rth2(550) is not particularly limited and is likely to be 0.80 or higher and is more likely to be 0.85 or higher.

The first optical compensation layer b can be obtained using a method including: forming a film such as a cellulose acylate film, a cyclic polyolefin film, or a polycarbonate film such that the does not have in-plane retardation and stretching the in a thickness (nz) direction using a heat-shrinkable film. In addition, a layer having a desired phase difference can also be formed by immobilizing the alignment state of the liquid crystal material, for example, by vertically aligning a rod-like liquid crystal compound. That is, the first optical compensation layer b may be a film obtained by immobilizing the liquid crystal compound that is aligned. In particular, the first optical compensation layer b may be a film obtained by immobilizing a rod-like liquid crystal compound that is aligned in a direction perpendicular to a substrate surface.

The thickness of the first optical compensation layer b is preferably 1 to 80 μm, more preferably 1 to 40 μm, and still more preferably 1 to 25 μm.

The first optical compensation layer b may be directly formed on the first optical compensation layer a or may be laminated thereon through a pressure sensitive adhesive or an adhesive.

It is also preferable that the first optical compensation layer has a two-layer configuration including: a polymer film including a cycloolefin polymer; and a liquid crystal layer that is provided adjacent-to the polymer film.

[Second Optical Compensation Layer]

In order to adjust the total retardation between the liquid crystal layer and the second polarizer to be in an appropriate range, it is preferable that the liquid crystal display device according to the embodiment of the present invention includes the second optical compensation layer. As the second optical compensation layer, an existing film having any phase difference can be used. It is preferable that the second optical compensation layer has a thickness-direction retardation, and it is more preferable that the second optical compensation layer is a [quasi-]uniaxial film of nx≅ny<nz (a positive [quasi-] C-plate). The retardation of the second optical compensation layer is not particularly limited as long as the total retardation between the liquid crystal layer and the second polarizer is in a predetermined range, and it is preferable that the retardation of the second optical compensation layer satisfies the following Expressions (5) and (6).

$$0 \text{ nm} \leq Re2(550) \leq 10 \text{ nm} \quad \text{Expression (5):}$$

$$-100 \text{ nm} \leq Rth2(550) \leq 0 \text{ nm} \quad \text{Expression (6):}$$

The second optical compensation layer satisfies more preferably the following Expression (5-1), still more preferably the following Expression (6-1), and still more preferably the following Expression (6-2).

$$0 \text{ nm} \leq Re2(550) \leq 5 \text{ nm} \quad \text{Expression (5-1):}$$

$$-60 \text{ nm} \leq Rth2(550) \leq -20 \text{ nm} \quad \text{Expression (6-1):}$$

$$-50 \text{ nm} \leq Rth2(550) \leq -30 \text{ nm} \quad \text{Expression (6-2):}$$

The thickness-direction retardation of the second optical compensation layer is not particularly limited, and from the viewpoint that the effects of the present invention is more significant, a ratio of a thickness-direction retardation Rth2 (450) of the second optical compensation layer at a wavelength of 450 nm to the thickness-direction retardation Rth2(550) of the second optical compensation layer at a wavelength of 550 nm satisfies the following Expression (13).

$$Rth2(450)/Rth2(550) \leq 1.00 \quad \text{Expression (13):}$$

The lower limit of Rth2(450)/Rth2(550) is not particularly limited and is likely to be 0.80 or higher and is more likely to be 0.85 or higher.

The second optical compensation layer can be obtained using a method including: forming a film such as a cellulose acylate film, a cyclic polyolefin film, or a polycarbonate film such that the does not have in-plane retardation and stretching the in a thickness (nz) direction using a heat-shrinkable film. In addition, a layer having a desired phase difference can also be formed by immobilizing the alignment state of the liquid crystal material, for example, by vertically aligning a rod-like liquid crystal compound. That is, the second optical compensation layer may be a film obtained by immobilizing the liquid crystal compound that is aligned. In particular, the second optical compensation layer may be a film obtained by immobilizing a rod-like liquid crystal compound that is aligned in a direction perpendicular to a substrate surface.

In a case where the liquid crystal material is used, the liquid crystal layer may be directly formed on the polarizer, and the formed liquid crystal layer may be bonded to the polarizer through an adhesive or a pressure sensitive adhesive. In addition, the second optical compensation layer may include two or more layers including a support and the liquid crystal layer, and the liquid crystal layer may be bonded to the protective film of the polarizer through an adhesive or a pressure sensitive adhesive. The liquid crystal layer alone may be formed by peeling off the support after bonding the liquid crystal layer.

The thickness of the second optical compensation layer is preferably 1 to 80 µm, more preferably 1 to 40 µm, and still more preferably 1 to 25 µm.

[Polarizing Plate]

The polarizing plate includes at least a polarizer, in which an optical compensation layer or a protective film is optionally laminated. In a case where the polarizing plate includes the first optical compensation layer, the absorption axis of the polarizer and the slow axis of the first optical compensation layer are parallel to each other. On a surface of the polarizer opposite to the optical compensation layer, the protective film may be provided, a curable resin layer may be disposed, or another member of the liquid crystal display device may be directly bonded. In addition, the protective film may be disposed between the optical compensation layer and the polarizer or on the surface of the optical compensation layer opposite to the polarizer through a pressure sensitive adhesive or an adhesive.

In order to laminate the polarizer and the optical film such as the optical compensation layer or the protective film, an adhesive can be used. The thickness of the adhesive layer between the polarizer and the optical film is preferably about 0.01 to 30 µm, more preferably 0.01 to 10 µm, and still more preferably 0.05 to 5 µm. In a case where the thickness of the adhesive layer is in the above-described range, floating or peeling does not occur between the optical film and the polarizer that are laminated, and an adhesion force that has no problem in practice can be obtained.

As a preferable adhesive, for example, an aqueous adhesive, that is, an adhesive in which an adhesive component is dissolved or dispersed in water can be used, and an adhesive formed of a polyvinyl alcohol resin aqueous solution is preferably used.

As the adhesive formed of a polyvinyl alcohol resin aqueous solution, for example, not only a vinyl alcohol homopolymer that is obtained by performing a saponification treatment on polyvinyl acetate as a homopolymer of vinyl acetate but also a vinyl alcohol copolymer that is obtained by performing a saponification treatment on a copolymer of vinyl acetate and another monomer that is copolymerizable with vinyl acetate and further a modified polyvinyl alcohol polymer that is obtained by partially modifying a hydroxyl group thereof can be used.

As a crosslinking agent, for example, a polyvalent aldehyde, a water-soluble epoxy compound, a melamine compound, a zirconia compound, a zinc compound, or glyoxylic acid may be added to the adhesive. In a case where an aqueous adhesive is used, the thickness of the adhesive layer obtained from the polyvinyl alcohol adhesive is typically 1 µm.

As another preferable adhesive, for example, a curable adhesive composition including a cationically polymerizable compound or a curable adhesive composition including a radically polymerizable compound that is cured by irradiation of an active energy ray or by heating can be used. Examples of the cationically polymerizable compound include a compound having an epoxy group or an oxetanyl group. The epoxy compound is not particularly limited as long as it includes at least two epoxy groups in the molecule. For example, a compound that is described in JP2004-245925A in detail can be used.

The radically polymerizable compound is not particularly limited as long as it is a radically polymerizable compound having an unsaturated double bond such as a (meth)acryloyl group or a vinyl group, and examples thereof include a monofunctional radically polymerizable compound, a polyfunctional radically polymerizable compound having two or more polymerizable groups in a molecule, a (meth)acrylate having a hydroxyl group, acrylamide, and acryloylmorpholine. Among these compounds, one kind may be used alone, two or more kinds may be used in combination. For example, a compound that is described in JP2015-011094A in detail can be used. In addition, a radically polymerizable compound and a cationically polymerizable compound may also be used in combination.

In a case where the curable adhesive is used, an optical film is laminated using a laminating roll and is optionally dried and irradiated with an active energy ray or heated to cure the curable adhesive. A light source of the active energy ray is not particularly limited, and an active energy ray having an emission distribution of a wavelength of 400 nm or shorter is preferable. Specifically, a low-pressure mercury lamp, a middle-pressure mercury lamp, a high-pressure mercury lamp, an ultrahigh pressure mercury lamp, a chemical lamp, a black light lamp, a microwave excitation mercury lamp, or a metal halide lamp is more preferable.

In addition, in a case where the optical film and the polarizer are bonded through an adhesive, in order to improve the adhesion strength and to improve the wettability of the adhesive on the surface of the optical film, a surface treatment (for example, a glow discharge treatment, a corona discharge treatment, or an ultraviolet (UV) treatment) may be performed on a surface of the optical film opposite to the polarizer, or an easily adhesive layer may be formed thereon. For example, a material or a forming method of the easily adhesive layer described in JP2007-127893A can be used.

[Polarizer]

The polarizer included in the polarizing plate is not particularly limited as long as it is a so-called linear polarizer having a function of converting natural light into specific linearly polarized light. The polarizer is not particularly limited, and an absorbing polarizer can be used. For example, one of an iodine polarizer, a dye polarizer using a dichroic dye, or a polyene polarizer can be used.

In the present invention, the thickness of the polarizer is not particularly limited and is preferably 3 µm to 60 µm, more preferably 5 µm to 30 µm, and still more preferably 5 µm to m.

[Protective Film]

A material of the protective film is not particularly limited, and examples thereof include a cellulose acylate (for example, a cellulose triacetate, a cellulose diacetate, a cellulose acetate butyrate, or a cellulose acetate propionate), a polyacrylic resin such as polymethyl methacrylate, a polyolefin such as polyethylene or polypropylene, a polyester resin such as polyethylene terephthalate or polyethylene naphthalate, a polyethersulfone film, a polyurethane resin, a polycarbonate, a polysulfone, a polyether, a polymethylpentene, a polyether ketone, a (meth)acrylonitrile, a polymer having an alicyclic structure (a norbornene resin (ARTON;

trade name) manufactured by JSR Corporation), and an amorphous polyolefin (ZEONEX; trade name; manufactured by Zeon Corporation).

It is preferable that the optical characteristics of the protective film satisfy the following expressions.

$$0 \text{ nm} \leq Re(550) \leq 10 \text{ nm}$$

$$-40 \text{ nm} \leq Rth(550) \leq 40 \text{ nm}$$

In addition, in a case where the protective film is disposed between the polarizer and the liquid crystal cell, it is more preferable that the following Expressions are satisfied.

$$0 \text{ nm} \leq Re(550) \leq 5 \text{ nm}$$

$$-10 \text{ nm} \leq Rth(550) \leq 10 \text{ nm}$$

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

Example 1

<Preparation of IPS Mode Liquid Crystal Display Device>

First, an IPS mode liquid crystal cell 1 in which a liquid crystal layer was provided between two glass substrates and the interval (gap: d) between the substrates was 4.0 μm was prepared. Δn of the liquid crystal layer was 0.08625, and the value of Δn·d of the liquid crystal layer was 320 nm. Various color filter layers having different Rth values were formed on visible side inner surfaces of the substrates of the liquid crystal cell, and IPS mode liquid crystal cells shown in Table 1 were respectively prepared.

The value of Rth was adjusted by adjusting the thicknesses of the color filter layers or by adding a retardation increasing agent (for example, the compound represented by Formula (X)) or retardation decreasing agent (for example, the compound represented by Formula (XI) to a material for forming the color filter layer, or by adjusting the addition amount thereof. In addition, all the liquid crystal cells were prepared such that Rth of the color filters were substantially constant in a visible light range.

TABLE 1

|  | Color Filter Rth(550) | Δnd |
| --- | --- | --- |
| Liquid Crystal Cell 1 | −10 | 320 |
| Liquid Crystal Cell 2 | −20 | 360 |
| Liquid Crystal Cell 3 | −30 | 340 |
| Liquid Crystal Cell 4 | 15 | 325 |
| Liquid Crystal Cell 5 | 30 | 350 |
| Liquid Crystal Cell 6 | 5 | 335 |

<Preparation of First Optical Compensation Layer 1>

As the first optical compensation layer a, by monoaxially stretching a non-stretched cycloolefin polymer film (manufactured by JSR Corporation, trade name: ARTON film), a cycloolefin polymer having Re=130 nm, Rth=65 nm, and a thickness of 24 μm was prepared.

A corona treatment was performed on a single surface of the polymer film in a discharge amount of 150 W·min/m², and a liquid crystal layer-forming composition 1 having the following composition was applied to the corona-treated surface using a wire bar of #3.0. Next, in order to dry the solvent in the composition and to age the alignment of the liquid crystal compound, the coating film was heated with warm air at 70° C. for 90 seconds. Under a nitrogen purge, the coating film was irradiated with ultraviolet light (300 mJ/cm²) at 40° C. at an oxygen concentration of 100 ppm to immobilize the alignment of the liquid crystal compound. As a result, the first optical compensation layer 1 was prepared by immobilizing the alignment of the liquid crystal compound to form the liquid crystal layer (corresponding to the first optical compensation layer b).

| Liquid Crystal Layer-Forming Composition 1 | |
| --- | --- |
| Liquid crystal compound R1 | 100.0 parts by mass |
| Alignment assistant A1 | 2.0 parts by mass |
| Compound B1 | 4.5 parts by mass |
| Monomer K1 | 8.0 parts by mass |
| Polymerization initiator P1 | 5.0 parts by mass |
| Polymerization initiator P2 | 2.0 parts by mass |
| Surfactant S1 | 0.4 parts by mass |
| Surfactant S2 | 0.5 parts by mass |
| Acetone | 426.0 parts by mass |
| Propylene glycol monomethyl ether acetate | 49.0 parts by mass |
| Methanol | 14.7 parts by mass |

Liquid Crystal Compound R1

A mixture obtained by mixing the following liquid crystal compound (RA), (RB), and (RC) at 83:15:2 (mass ratio)

(RA)

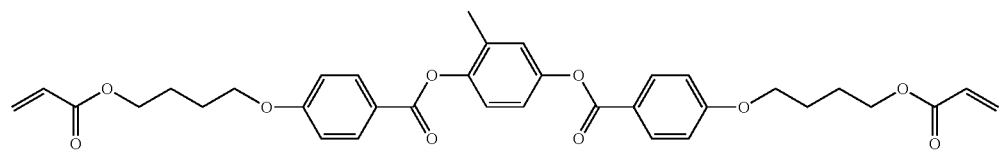 [SMILES: C=CC(=O)OCCCCOc1ccc(C(=O)Oc2ccc(OC(=O)c3ccc(OCCCCOC(=O)C=C)cc3)c(C)c2)cc1]

-continued
Liquid Crystal Layer-Forming Composition 1
(RB)
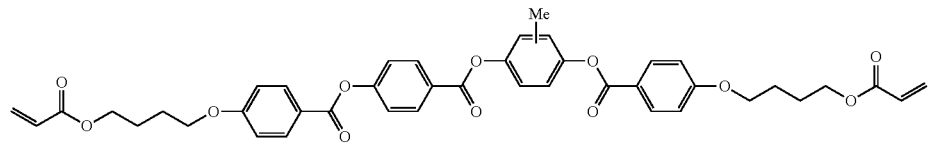
(RC)
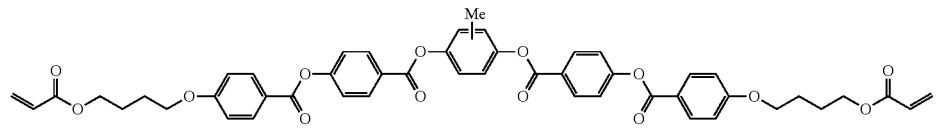
Alignment assistant A1
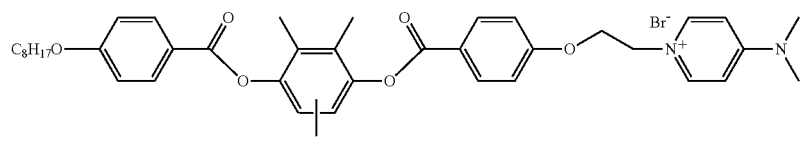
Compound B1
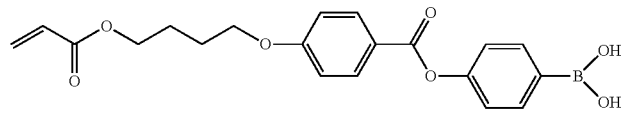
Monomer K1: A-TMMT (manufactured by Shin-Nakamura Chemical Co., Ltd.)
Polymerization initiator P1
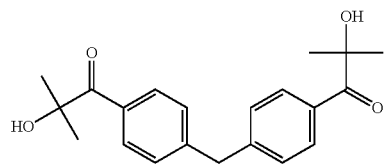 [SMILES: CC(C)(O)C(=O)c1ccc(Cc2ccc(C(=O)C(C)(C)O)cc2)cc1]
Polymerization initiator P2
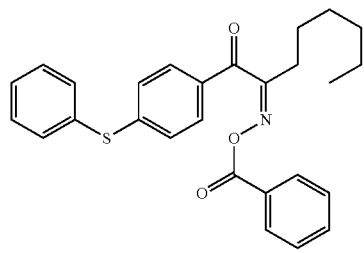 [SMILES: CCCCCC/C(=N/OC(=O)c1ccccc1)C(=O)c1ccc(Sc2ccccc2)cc1]
Surfactant S1 (weight-average molecular weight: 15000, a numerical value in each repeating unit in a structural formula is expressed in mass %)
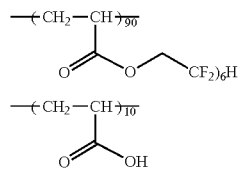

| Liquid Crystal Layer-Forming Composition 1 |
|---|

Surfactant S2 (weight-average molecular weight: 11,200)
A numerical value in each repeating unit in a structural formula is expressed in mass %

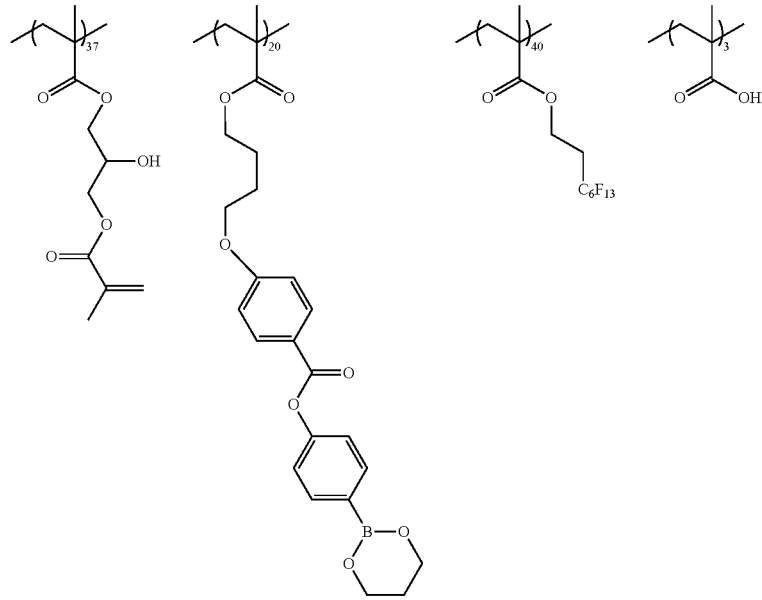

Regarding the prepared first optical compensation layer a and the prepared first optical compensation layer b, Re(550) and Rth(550) were measured using the above-described method. The results are shown in Table 2 below.

<Preparation of Protective Film 1>

[Preparation of Core Layer Cellulose Acylate Dope 1]

The following respective components were put into a mixing tank and were stirred with each other to dissolve the respective components. As a result, a core layer cellulose acylate dope 1 was prepared.

| Core layer cellulose acylate dope 1 | |
|---|---|
| Cellulose acetate having an acetyl substitution degree of 2.88 mass | 100 parts by mass |
| The following ester oligomer A | 10 parts by mass |
| The following polarizer durability improver | 4 parts by mass |
| The following ultraviolet absorber | 2 parts by mass |
| Methylene chloride (first solvent) | 430 parts by mass |
| Methanol (second solvent) | 64 parts by mass |

Ester oligomer A (weight-average molecular weight: 750)

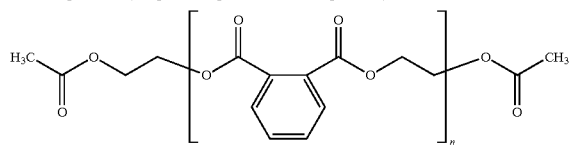

The following polarizer durability improver

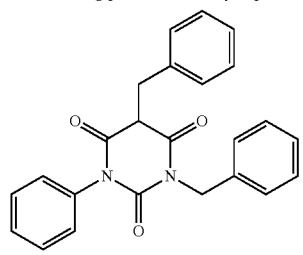

Core layer cellulose acylate dope 1

Ultraviolet absorber

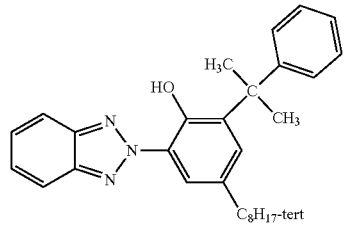

[Preparation of Outer Layer Cellulose Acylate Dope 1]

10 parts by mass of the following matting agent solvent was added to 90 parts by mass of the above-described core layer cellulose acylate dope 1 to prepare an outer layer cellulose acylate dope 1.

| Outer layer cellulose acylate dope 1 | | |
|---|---|---|
| Silica particles having an average particle size of 20 nm (AEROSIL R972, manufactured by Nippon Aerosil Co., Ltd.) | . . . | 2 parts by mass |
| Methylene chloride (first solvent) | . . . | 76 parts by mass |
| Methanol (second solvent) | . . . | 11 parts by mass |
| Core layer cellulose acylate dope 1 | . . . | 1 part by mass |

[Preparation of Cellulose Acylate Film 1]

The core layer cellulose acylate dope 1 and the outer layer cellulose acylate dope 1 were simultaneously cast on a drum at 20° C. from casting nozzles such that the outer layer cellulose acylate solutions are disposed on opposite sides of the core layer cellulose acylate solution. In a state where the solvent content in the film on the drum was 20 mass %, the film on the drum was peeled off, opposite ends of the film in the width direction were fixed using a tenter clip, and the film was horizontally stretched to 1.1 times and dried in a state where the residual solvent content was 3 to 15 mass %. Next, the obtained film was transported to a gap between rolls of a heat treatment device to be further dried. As a result, a cellulose acylate film 1 having a thickness of 40 μm was prepared as a protective film 1. Ina case where a phase difference of the protective film 1 was measured, Re=2 nm and Rth=7 nm.

<Preparation of Protective Film 2>

[Preparation of Core Layer Cellulose Acylate Dope 2]

The following respective components were put into a mixing tank and were stirred with each other to dissolve the respective components. As a result, a core layer cellulose acylate dope 2 was prepared.

| Core layer cellulose acylate dope 2 | |
|---|---|
| Cellulose acetate having an acetyl substitution degree of 2.88 | 100 parts by mass |
| The following polyester | 12 parts by mass |
| The above-described polarizer durability improver | 4 parts by mass |

| Core layer cellulose acylate dope 2 | |
|---|---|
| Methylene chloride (first solvent) | 430 parts by mass |
| Methanol (second solvent) | 64 parts by mass |

Polyester (number-average molecular weight: 800)

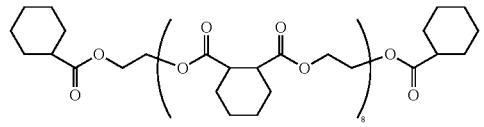

[Preparation of Outer Layer Cellulose Acylate Dope 2]

10 parts by mass of the following matting agent solvent was added to 90 parts by mass of the above-described core layer cellulose acylate dope 2 to prepare an outer layer cellulose acylate dope 2.

| Matting agent solvent | | |
|---|---|---|
| Silica particles having an average particle size of 20 nm (AEROSIL R972, manufactured by Nippon Aerosil Co., Ltd.) | . . . | 2 parts by mass |
| Methylene chloride (first solvent) | . . . | 76 parts by mass |
| Methanol (second solvent) | . . . | 11 parts by mass |
| Core layer cellulose acylate dope | . . . | 1 part by mass |

[Preparation of Cellulose Acylate Film 2]

The above-described core layer cellulose acylate dope 2 and the above-described outer layer cellulose acylate dope 2 were filtered through filter paper having an average pore size of 34 μm and a sintered metallic filter having an average pore size of 10 μm, respectively. Next, the core layer cellulose acylate dope 2 and the outer layer cellulose acylate dope 2 were simultaneously cast on a drum at 20° C. from casting nozzles such that the outer layer cellulose acylate solutions are disposed on opposite sides of the core layer cellulose acylate solution (band casting machine).

Next, in a state where the solvent content in the film on the drum was 20 mass %, the film on the drum was peeled off, opposite ends of the film in the width direction were fixed using a tenter clip, and the film was horizontally stretched to a stretching ratio of 1.1 times and dried.

Next, the obtained film was transported to a gap between rolls of a heat treatment device to be further dried. As a result, a cellulose acylate film 2 having a thickness of 40 μm was prepared as a protective film 2. In a case where a phase difference of the protective film 2 was measured, Re=1 nm and Rth=−5 nm.

<Saponification Treatment of Protective Film>

The protective films 1 and 2 were dipped in 2.3 mol/L of sodium hydroxide aqueous solution at 55° C. for 3 minutes. Next, the dipped protective films 1 and 2 were extracted, were cleaned in a water cleaning bath at room temperature, and were further neutralized using 0.05 mol/L of sulfuric acid at 30° C. Further, the obtained protective films 1 and 2 were cleaned in a water cleaning bath at room temperature and were dried with warm air at 100° C. to perform a saponification treatment on surfaces of the dipped protective films 1 and 2.

<Preparation of Polarizing Plate>

The prepared protective film 1 on which the saponification treatment was performed, the polyvinyl alcohol polarizer, and the first optical compensation layer 1 were laminated using an adhesive such that the absorption axis of the polarizer and the slow axis of the first optical compensation layer 1 were parallel to each other and the liquid crystal layer side of the first optical compensation layer was the polarizer side. As a result, a first polarizing plate according to Example 1 was prepared. As the adhesive, a 3% PVA (manufactured by Kuraray Co., Ltd., PVA-117H) aqueous solution was used.

In addition, the prepared protective film 1 on which the saponification treatment was performed, the polyvinyl alcohol polarizer, and the prepared protective film 2 on which the saponification treatment was performed were laminated using the same method to prepare a second polarizing plate. At this time, the polarizer and the optical compensation layer were bonded with sufficient adhesiveness in practice.

<Preparation of Liquid Crystal Display Device>

The first polarizing plate and the second polarizing plate were laminated on the prepared liquid crystal cell such that the first optical compensation layer and the protective film 2 were positioned on the liquid crystal cell side using SK 2057 (manufactured by Soken Chemical & Engineering Co., Ltd.). As a result, a liquid crystal display device according to Example 1 was prepared. At this time, the first polarizing plate and the second polarizing plate were laminated such that the slow axis of the liquid crystal layer in the liquid crystal cell and the absorption axis of the first polarizing plate were perpendicular to each other and the slow axis of the liquid crystal layer in the liquid crystal cell and the absorption axis of the second polarizing plate were parallel to each other. In addition, the first polarizing plate was bonded to the surface of the liquid crystal cell on which the color filter was not disposed, and the second polarizing plate was bonded to the surface of the liquid crystal cell where the color filter was disposed.

[Optical Performance of Liquid Crystal Display Device]

The prepared liquid crystal display device was disposed on a diffuse light source such that the second polarizing plate faced upward (in other words, the diffuse light source was disposed on the side of the first polarizing plate opposite to the liquid crystal cell side), and light leak and tint at the time of black display were measured using the following method. The evaluation results are shown in Table 2 below.

<<Measurement of Light Leak and Tint at Time of Black Display>

The prepared liquid crystal display device was disposed on a diffuse light source and was fixed at a polar angle of 60°, and light leak and a tint change at the time of black display in a range of an azimuthal angle 0° (horizontal direction) to 359 were measured counterclockwise per 1 using a measuring instrument "EZ-Contrast XL88" (manufactured by ELDIM).

A: the light leak was extremely small and was particularly excellent
B: the light leak was small and was excellent
C: the light leak was slightly large and had no problem in practice
D: the light leak was large and was not allowable A black tint at a polar angle of 60° was evaluated based on the following evaluation standards.

A: the tint change was extremely small and was particularly excellent
B: the tint change was small and was excellent
C: the tint change was slightly large and had no problem in practice
D: the tint change was large and was not allowable

TABLE 2

| | First Optical Compensation Layer a | | | First Optical Compensation Layer b | | | Liquid Crystal Cell | Color Filter Rth (550) | Second Optical Compensation Layer | | | | Re_total (550) | Rth_total (550) | Evaluation | |
|---|---|---|---|---|---|---|---|---|---|---|---|---|---|---|---|---|
| | Re1a (550) | Re1a (450)/ Re1a (550) | Rth1a (550) | Re1b (550) | Rth1b (550) | Rth1b (450)/ Rth1b (550) | | | Re2 (550) | Rth2 (550) | Rth2 (450)/ Rth2 (550) | | | | Oblique Light Leak Evaluation | Tint Evaluation |
| Example 1 | 130 | 1.0 | 65 | 0 | −120 | 1.2 | 1 | −10 | 1 | −5 | 1.2 | 1 | −15 | B | B |
| Example 2 | 125 | 1.0 | 63 | 0 | −125 | 1.2 | 2 | −20 | 1 | −5 | 1.2 | 1 | −25 | A | B |
| Example 3 | 120 | 1.0 | 60 | 0 | −100 | 1.2 | 3 | −30 | 1 | −5 | 1.2 | 1 | −35 | B | B |
| Example 4 | 135 | 1.0 | 68 | 0 | −115 | 1.2 | 4 | 15 | 0 | −20 | 1.2 | 0 | −5 | B | C |
| Example 5 | 130 | 1.0 | 65 | 0 | −120 | 1.2 | 4 | 15 | 0 | −30 | 1.2 | 0 | −15 | B | C |
| Example 6 | 125 | 1.0 | 63 | 0 | −125 | 1.2 | 4 | 15 | 0 | −40 | 1.2 | 0 | −25 | B | B |
| Example 7 | 120 | 1.0 | 60 | 0 | −130 | 1.2 | 4 | 15 | 0 | −50 | 1.2 | 0 | −35 | B | B |
| Example 8 | 125 | 1.0 | 63 | 0 | −130 | 0.9 | 4 | 15 | 0 | −40 | 1.2 | 0 | −25 | B | A |
| Example 9 | 135 | 1.0 | 70 | 0 | −130 | 0.9 | 4 | 15 | 0 | −40 | 1.2 | 0 | −25 | A | B |
| Example 10 | 115 | 1.0 | 60 | 0 | −130 | 0.9 | 4 | 15 | 0 | −40 | 1.2 | 0 | −25 | C | A |
| Example 11 | 130 | 1.0 | 65 | 0 | −140 | 0.9 | 4 | 15 | 0 | −40 | 1.2 | 0 | −25 | C | A |
| Example 12 | 130 | 1.0 | 65 | 0 | −120 | 0.9 | 4 | 15 | 0 | −40 | 1.2 | 0 | −25 | B | A |
| Example 13 | 130 | 1.0 | 65 | 0 | −120 | 0.9 | 5 | 30 | 0 | −50 | 1.2 | 0 | −20 | A | B |
| Example 14 | 130 | 1.0 | 65 | 0 | −100 | 0.9 | 6 | 5 | 0 | −30 | 1.2 | 0 | −25 | A | B |
| Example 15 | 135 | 1.0 | 70 | 0 | −130 | 0.9 | 4 | 15 | 1 | −40 | 1.2 | 2 | −28 | A | B |
| Example 16 | 135 | 1.0 | 70 | 0 | −130 | 0.9 | 4 | 15 | 2 | −40 | 1.2 | 2 | −25 | A | B |
| Example 17 | 135 | 1.0 | 70 | 0 | −130 | 0.9 | 4 | 15 | 2 | −40 | 0.9 | 2 | −25 | A | A |
| Example 18 | 260 | 1.0 | −35 | | | | 4 | 15 | 2 | −40 | 0.9 | 2 | −25 | A | A |
| Comparative Example 1 | 150 | 1.0 | 75 | 0 | −105 | 1.2 | 4 | 15 | 1 | −5 | 1.2 | 1 | 10 | C | D |

TABLE 2-continued

| | First Optical Compensation Layer a | | | First Optical Compensation Layer b | | | | Second Optical Compensation Layer | | | | | | Evaluation | |
|---|---|---|---|---|---|---|---|---|---|---|---|---|---|---|---|
| | Re1a (550) | Re1a (450)/ Re1a (550) | Rth1a (550) | Re1b (550) | Rth1b (550) | Rth1b (450)/ Rth1b (550) | Liquid Crystal Cell | Color Filter Rth (550) | Re2 (550) | Rth2 (550) | Rth2 (450)/ Rth2 (550) | Re_total (550) | Rth_total (550) | Oblique Light Leak Evaluation | Tint Evaluation |
| Comparative Example 2 | 130 | 1.0 | 65 | 0 | −100 | 1.2 | 4 | 15 | 1 | −5 | 1.2 | 1 | 10 | D | B |
| Comparative Example 3 | 160 | 1.0 | 80 | 0 | −105 | 1.2 | 5 | 30 | 0 | −10 | 1.2 | 0 | 20 | D | D |

Examples 2 and 3 and Comparative Examples 1 and 2

Liquid crystal display devices according to Example 2 and 3 and Comparative Examples 1 and 2 were prepared using the same method as that of Example 1, except that the kind of the liquid crystal cell, Re(550) and Rth(550) of the first optical compensation layer a, and Rth(550) of the first optical compensation layer b were changed as shown in Table 2. Using these liquid crystal display devices, the above-described evaluation was performed. The results are shown in Table 2 above.

Regarding the first optical compensation layer a, the non-stretched ARTON film (manufactured by JSR Corporation) was stretched such that Re(550) and Rth(550) were as shown in Table 1. As a result, the first optical compensation layer according to each of Examples and Comparative Examples was prepared.

Example 4

<Preparation of Optical Film in which Liquid Crystal Layer was Peelable>

A liquid crystal layer-forming composition 2 prepared as shown in the following table was applied to a cellulose polymer film (TAC; TG40, manufactured by Fuji Film Co., Ltd.) using a #1.2 wire bar. In order to dry the solvent in the composition and to age the alignment of the liquid crystal compound, the coating film was heated with warm air at 40° C. for 60 seconds. Next, under a nitrogen purge, the coating film was irradiated with ultraviolet light (300 mJ/cm$^2$) at 40° C. at an oxygen concentration of 100 ppm to immobilize the alignment of the liquid crystal compound. As a result, an optical film in which the liquid crystal layer (corresponding to the second optical compensation layer) was peelable from the TAC support was prepared.

| Liquid crystal layer-forming composition 2 | |
|---|---|
| Liquid crystal compound R1 | 100 parts by mass |
| Alignment assistant A1 | 2 parts by mass |
| Monomer K2 | 8 parts by mass |
| Polymerization initiator P1 | 2 parts by mass |
| Polymerization initiator P2 | 4 parts by mass |
| Surfactant S1 | 0.4 parts by mass |
| Surfactant S3 | 0.3 parts by mass |
| Polymer compound C1 | 5 parts by mass |
| Toluene | 621 parts by mass |
| Methyl ethyl ketone | 69 parts by mass |

Monomer K2: VISCOAT #360 (manufactured by Osaka Organic Chemical Industry Ltd.)
Surfactant S3

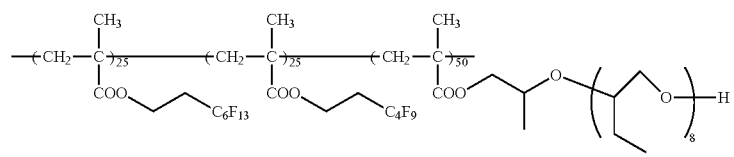

Polymer compound C1

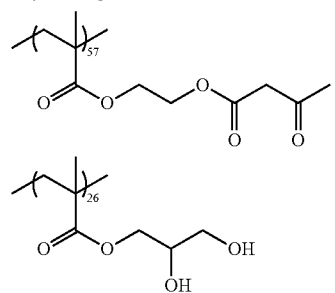

Liquid crystal layer-forming composition 2

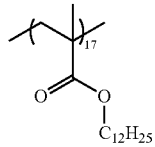

The liquid crystal surface of the prepared peelable optical film was bonded to a glass plate using SK2057 (manufactured by Soken Chemical&Engineering Co., Ltd.) and the TAC support was peeled off to prepare a film including the liquid crystal layer alone. In a case where a phase difference of the obtained film was measured, Re(550)=0 nm and Rth(550)=−20 nm.

The liquid crystal surface of the prepared peelable optical film was directly bonded to the polarizer using SK2057 (manufactured by Soken Chemical&Engineering Co., Ltd.) and the TAC support was peeled off to prepare a second polarizing plate in which the protective film 1, the polarizer, and the liquid crystal layer were laminated in this order.

A liquid crystal display device according to Example 4 was prepared using the same method as that of Example 1, except that the above-described second polarizing plate was used and the kind of the liquid crystal cell, Re(550) and Rth(550) of the first optical compensation layer a, and Rth(550) of the first optical compensation layer b were changed as shown in Table 2. Using these liquid crystal display device, the above-described evaluation was performed. The results are shown in Table 2 above.

Examples 5 to 7 and Comparative Example 3

Liquid crystal display devices according to Examples 5 to 7 and Comparative Example 3 were prepared using the same method as that of Example 4, except that Rth was changed to a value shown in Table 2 above by changing the thickness of the liquid crystal layer of the peelable optical film and Re and Rth of the first optical compensation layer a and the first optical compensation layer b were further changed to values shown in Table 2 above. Using these liquid crystal display devices, the above-described evaluation was performed. The results are shown in Table 2 above.

Examples 8 to 14

A liquid crystal display device according to Example 8 was prepared using the same method as that of Example 4, except that the first optical compensation layer b was formed using the following liquid crystal layer-forming composition 3 and the kind of the liquid crystal cell, Re and Rth of the first optical compensation layer a, and Re and Rth of the second optical compensation layer were changed as shown in Table 2.

Liquid crystal display devices according to Examples 9 to 14 were prepared using the same method as described above, except that first optical compensation layers b according to Examples 9 to 14 were prepared by changing the mixing ratio of the following liquid crystal compounds and the thickness of the liquid crystal layer and the kind of the liquid crystal cell and Re and Rth of the first optical compensation layer a were changed as shown in Table 2. The results are shown in Table 2 above.

The liquid crystal layer-forming composition 3 was applied and was heated with warm air at 40° C. for 90 seconds in order to dry the solvent in the composition and to age the alignment of the liquid crystal compound. Under a nitrogen purge, the obtained coating film was irradiated with ultraviolet light (300 mJ/cm$^2$) at 40° C. at an oxygen concentration of 100 ppm.

| Liquid crystal layer-forming composition 3 | |
|---|---|
| Liquid crystal compound R1 | 28.0 parts by mass |
| Liquid crystal compound R2 | 10.0 parts by mass |
| Liquid crystal compound R3 | 54.0 parts by mass |
| Liquid crystal compound R4 | 8.0 parts by mass |
| Compound B1 | 4.5 parts by mass |
| Monomer K2 | 16.0 parts by mass |
| Polymerization initiator P1 | 5.0 parts by mass |
| Polymerization initiator P2 | 2.0 parts by mass |
| Surfactant S1 | 0.4 parts by mass |
| Surfactant S2 | 0.5 parts by mass |
| Acetone | 296.6 parts by mass |
| Propylene glycol monomethyl ether acetate | 77.0 parts by mass |
| Methanol | 11.6 parts by mass |

Liquid Crystal Compound R2

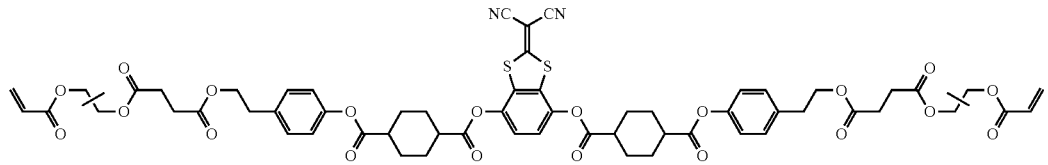

-continued

Liquid crystal layer-forming composition 3

Liquid Crystal Compound R3

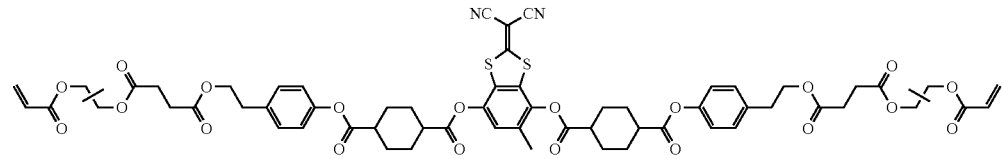

Liquid Crystal Compound R4

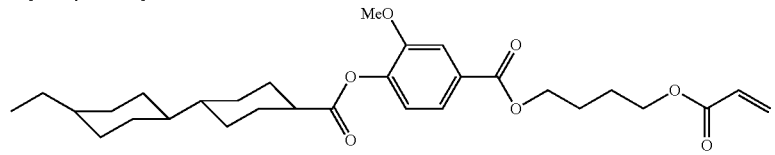

Example 15

<Preparation of Protective Film 3>

[Preparation of Polymethyl Methacrylate (PMMA) Dope]

The following dope composition was put into a mixing tank and was stirred with each other to dissolve the respective components. As a result, a PMMA dope was prepared.

| PMMA dope | | |
|---|---|---|
| PMMA Resin | . . . | 100 parts by mass |
| SUMILIZER GS (manufactured by Sumitomo Chemical Co., Ltd.) | . . . | 0.1 parts by mass |
| Dichloromethane | . . . | 426 parts by mass |
| Methanol | . . . | 64 parts by mass |

[Preparation of PMMA Film]

The above-described PMMA dope was uniformly cast from a casting die onto a stainless steel band (casting support) (band casting machine). In a case where the residual solvent content in the cast film was 20 mass %, the film was peeled off from the casting support as the cast film. Opposite ends of the peeled film in the width direction were fixed using a tenter clip, and the film was horizontally stretched to a stretching ratio of 1.1 times and dried. Next, the obtained film was transported to a gap between rolls of a heat treatment device to be further dried. As a result, a PMMA film having a thickness of 40 µm was prepared as a protective film 3. In a case where a phase difference of the protective film 3 was measured, Re (550)=1 nm and Rth (550)=−3 nm.

A corona treatment was performed on the polarizer bonding surface of the protective film 3 at a discharge amount of 150 W·min/m$^2$, and the protective film 1, the polyvinyl alcohol polarizer, and the protective film 3 were bonded to each other in this order through a 3% PVA (PVA-117H, manufactured by Kuraray Co., Ltd.) aqueous solution according to the above-described procedure. As a result, a polarizing plate was prepared. The liquid crystal surface of the peelable optical film was directly bonded to the surface of the protective film 3 using SK2057 (manufactured by Soken Chemical&Engineering Co., Ltd.) and the TAC support was peeled off to prepare a second polarizing plate in which the protective film 1, the polarizer, the protective film 3, and the liquid crystal layer were laminated in this order.

A liquid crystal display device according to Example 15 was prepared using the same method as that of Example 1, except that the above-described second polarizing plate was used and the kind of the liquid crystal cell, Re(550) and Rth(550) of the first optical compensation layer a, and Re(550) and Rth(550) of the first optical compensation layer b were changed as shown in Table 2. Using these liquid crystal display device, the above-described evaluation was performed. The results are shown in Table 2 above.

Example 16

Using the liquid crystal layer-forming composition 1, a liquid crystal layer was formed on the non-stretched cycloolefin polymer film (manufactured by JSR Corporation, trade name: ARTON film, Re=2 nm, Rth=5 nm) support. This film was used as the second optical compensation layer, and the polyvinyl alcohol polarizer was bonded to the liquid crystal layer side through a 3% PVA (manufactured by Kuraray Co., Ltd., PVA-117H) aqueous solution. As a result, a second polarizing plate in which the protective film 1, the polarizer, the liquid crystal layer, and the non-stretched cycloolefin polymer film were laminated in this order was prepared.

A liquid crystal display device according to Example 16 was prepared using the same method as that of Example 1, except that the above-described second polarizing plate was used and the kind of the liquid crystal cell, Re(550) and Rth(550) of the first optical compensation layer a, and Re(550) and Rth(550) of the first optical compensation layer b were changed as shown in Table 2. Using these liquid crystal display device, the above-described evaluation was performed. The results are shown in Table 2 above.

Example 17

Using the liquid crystal layer-forming composition 3, a liquid crystal layer was formed on the non-stretched cycloolefin polymer film (manufactured by JSR Corporation, trade name: ARTON film, Re=2 nm, Rth=5 nm) support. A liquid crystal display device according to Example 17 was prepared using the same method as that of Example 16, except that this film was used as the second optical compensation layer. Using this liquid crystal display device, the above-described evaluation was performed. The results are shown in Table 2 above.

Example 18

A liquid crystal display device according to Example 18 was prepared using the same method as that of Example 17, except that the first optical compensation layer was prepared using a method described in JP2006-072309A and was bonded such that the slow axis was parallel to the absorption axis of the polarizer. The results are shown in Table 2 above.

In Examples 1 to 18, even in a case where the polarizer and the optical compensation layer were bonded to each other using a method described below, excellent adhesiveness was able to be obtained, and the same display performance as that in a case where the polarizer and the optical compensation layer were bonded to each other using the above-described PVA 3% aqueous solution were able to be obtained.

(Preparation of Adhesive)

The following compounds were mixed with each other at a ratio described below to prepare an adhesive solution A.

ARONIX M-220 (manufactured by Toagosei Co., Ltd.): 20 parts by mass 4-hydroxybutyl acrylate (manufactured by Nippon Kasei Chemical Co., Ltd.): 40 parts by mass 2-ethylhexyl acrylate (manufactured by Mitsubishi Chemical Corporation): 40 parts by mass IRGACURE 907 (manufactured by BASF SE): 1.5 parts by mass KAYACURE DETX-S (manufactured by Nippon Kayaku Co., Ltd.): 0.5 parts by mass A corona treatment was performed on a surface of the optical compensation layer where the polarizer was laminated in a discharge amount of 150 W·min/m$^2$, and then the above-described adhesive was applied at a thickness of 0.5 μm. Next, the surface to which the adhesive was applied was laminated on the polarizer and was irradiated with ultraviolet light from the substrate side of the optical film at 300 mJ/cm$^2$ in an air atmosphere at 40° C. Next, the surface to which the adhesive was applied was dried at 60° C.° C. for 3 minutes. The first optical compensation layer b and the liquid crystal layer of the second optical compensation layer were cured by being irradiated with ultraviolet light at 300 mJ/cm$^2$ in an air atmosphere at 40° C.

EXPLANATION OF REFERENCES

1: outside protective film of second polarizer
2: second polarizer
3: absorption axis of second polarizer
4: second optical compensation layer
5: liquid crystal cell upper substrate
6: liquid crystal molecule (liquid crystal layer)
7: liquid crystal cell lower substrate
8: first optical compensation layer a
9: slow axis of first optical compensation layer a
10: first optical compensation layer b
11: first polarizer
12: absorption axis of first polarizer
13: outside protective film of first polarizer
14: backlight unit
15: first optical compensation layer
16: second polarizing plate
17: first polarizing plate

What is claimed is:

1. A liquid crystal display device comprising at least a first polarizer, a first optical compensation layer, a liquid crystal cell, and a second polarizer in this order,
wherein the liquid crystal cell includes a pair of substrates and a liquid crystal layer, in which an electric field including a component that is parallel to at least one of the substrates including an electrode is formed by the electrode, the pair of substrates being disposed to face each other, and the liquid crystal layer being disposed between the pair of substrates and having controlled alignment,
an absorption axis of the first polarizer is parallel to a slow axis of the first optical compensation layer,
a slow axis of the liquid crystal layer having controlled alignment at the time of black display is perpendicular to an absorption axis of the first polarizer,
an absorption axis of the first polarizer is perpendicular to an absorption axis of the second polarizer,
an in-plane retardation Re1(550) and a thickness-direction retardation Rth1(550) of the first optical compensation layer at a wavelength of 550 nm satisfy the following Expressions (1) and (2), $$80\ \text{nm} \leq Re1(550) \leq 320\ \text{nm}, \quad \text{Expression (1):}$$

$$-80\ \text{nm} \leq Rth1(550) \leq 150\ \text{nm}, \quad \text{Expression (2):}$$

at least one layer having a thickness-direction retardation is present between the liquid crystal layer and the second polarizer,
a total in-plane retardation Re_total(550) and a total thickness-direction retardation Rth_total(550) between the liquid crystal layer and the second polarizer satisfy the following Expressions (3) and (4), $$0\ \text{nm} \leq Re\_\text{total}(550) \leq 10\ \text{nm, and} \quad \text{Expression (3):}$$

$$Rth\_\text{total}(550) \leq 0\ \text{nm} \quad \text{Expression (4).}$$

2. The liquid crystal display device according to claim 1, wherein at least a color filter having a thickness-direction retardation is provided between the liquid crystal layer and the second polarizer.

3. The liquid crystal display device according to claim 2, wherein at least a second optical compensation layer is provided between the liquid crystal layer and the second polarizer.

4. The liquid crystal display device according to claim 2, wherein at least a color filter having a thickness-direction retardation and a second optical compensation layer are provided between the liquid crystal layer and the second polarizer in this order from the liquid crystal layer side.

5. The liquid crystal display device according to claim 1, wherein at least a second optical compensation layer is provided between the liquid crystal layer and the second polarizer.

6. The liquid crystal display device according to claim 5, wherein an in-plane retardation Re2(550) and a thickness-direction retardation Rth2(550) of the second optical compensation layer at a wavelength of 550 nm satisfy the following Expressions (5) and (6), $$0\ \text{nm} \leq Re2(550) \leq 10\ \text{nm, and} \quad \text{Expression (5):}$$

$$-100\ \text{nm} \leq Rth2(550) \leq 0\ \text{nm} \quad \text{Expression (6).}$$

7. The liquid crystal display device according to claim 5, wherein the second optical compensation layer is a film obtained by immobilizing a liquid crystal compound that is aligned.

8. The liquid crystal display device according to claim 7, wherein the second optical compensation layer is a film obtained by immobilizing a rod-like liquid crystal compound that is aligned in a direction perpendicular to a substrate surface.

9. The liquid crystal display device according to claim 5, wherein at least a color filter having a thickness-direction retardation and a second optical compensation layer are provided between the liquid crystal layer and the second polarizer in this order from the liquid crystal layer side.

10. The liquid crystal display device according to claim 1, wherein at least a color filter having a thickness-direction retardation and a second optical compensation layer are provided between the liquid crystal layer and the second polarizer in this order from the liquid crystal layer side.

11. The liquid crystal display device according to claim 1, wherein a ratio of an in-plane retardation Re1(450) of the first optical compensation layer at a wavelength of 450 nm to the in-plane retardation Re1(550) of the first optical compensation layer at a wavelength of 550 nm satisfies the following Expression (7), $$0.95 \leq Re1(450)/Re1(550) \leq 1.30 \qquad \text{Expression (7)}.$$

12. The liquid crystal display device according to claim 1, wherein the first optical compensation layer has a two-layer structure, and
a first optical compensation layer a and a first optical compensation layer b are laminated in this order from the liquid crystal cell side.

13. The liquid crystal display device according to claim 12, wherein an in-plane retardation Re1a(550) and a thickness-direction retardation Rth1a(550) of the first optical compensation layer a at a wavelength of 550 nm satisfy the following Expressions (8) and (9), $$80 \text{ nm} \leq Re1a(550) \leq 200 \text{ nm}, \qquad \text{Expression (8):}$$

$$20 \text{ nm} \leq Rth1a(550) \leq 150 \text{ nm}, \qquad \text{Expression (9):}$$

an in-plane retardation Re1b(550) and a thickness-direction retardation Rth1b(550) of the first optical compensation layer b at a wavelength of 550 nm satisfy the following Expressions (10) and (11), $$0 \text{ nm} \leq Re1b(550) \leq 40 \text{ nm, and} \qquad \text{Expression (10):}$$

$$-180 \text{ nm} \leq Rth1b(550) \leq -60 \text{ nm} \qquad \text{Expression (11)}.$$

14. The liquid crystal display device according to claim 12, wherein a ratio of a thickness-direction retardation Rth1b(450) of the first optical compensation layer b at a wavelength of 450 nm to the thickness-direction retardation Rth1b(550) of the first optical compensation layer b at a wavelength of 550 nm satisfies the following Expression (12), $$Rth1b(450)/Rth1b(550) \leq 1.00 \qquad \text{Expression (12)}.$$

15. The liquid crystal display device according to claim 12, wherein the first optical compensation layer a is a polymer film including a cycloolefin polymer.

16. The liquid crystal display device according to claim 12, wherein the first optical compensation layer b is a film obtained by immobilizing a liquid crystal compound that is aligned.

17. The liquid crystal display device according to claim 16, wherein the first optical compensation layer b is a film obtained by immobilizing a rod-like liquid crystal compound that is aligned in a direction perpendicular to a substrate surface.

18. The liquid crystal display device according to claim 1, wherein the first optical compensation layer is directly bonded to the first polarizer through a polyvinyl alcohol adhesive.

19. The liquid crystal display device according to claim 1, wherein the first optical compensation layer is directly bonded to the first polarizer through a curable adhesive composition that is cured by irradiation of an active energy ray or by heating.

20. The liquid crystal display device according to claim 1, wherein a backlight unit is further provided on a surface of the first polarizer opposite to the first optical compensation layer side.

\* \* \* \* \*